US012091242B2

(12) United States Patent
Bee

(10) Patent No.: US 12,091,242 B2
(45) Date of Patent: Sep. 17, 2024

(54) DEVICE FOR TRANSPORTING A WASTE CONTAINER

(71) Applicant: G H ENTERPRISE (WA) PTY LTD, Doodlakine (AU)

(72) Inventor: Graham John Bee, Doodlakine (AU)

(73) Assignee: G H ENTERPRISE (WA) PTY LTD, Doodlakine (AU)

( * ) Notice: Subject to any disclaimer, the term of this patent is extended or adjusted under 35 U.S.C. 154(b) by 339 days.

(21) Appl. No.: 17/601,184

(22) PCT Filed: Apr. 3, 2020

(86) PCT No.: PCT/AU2020/050332
§ 371 (c)(1),
(2) Date: Oct. 4, 2021

(87) PCT Pub. No.: WO2020/198802
PCT Pub. Date: Oct. 8, 2020

(65) Prior Publication Data
US 2022/0169443 A1 Jun. 2, 2022

(30) Foreign Application Priority Data
Apr. 4, 2019 (AU) ................................ 2019901146

(51) Int. Cl.
*B65F 1/14* (2006.01)
*B65F 1/12* (2006.01)

(52) U.S. Cl.
CPC ............ *B65F 1/1468* (2013.01); *B65F 1/122* (2013.01)

(58) Field of Classification Search
CPC ................................ B65F 1/1468; B65F 1/122
See application file for complete search history.

(56) References Cited

U.S. PATENT DOCUMENTS

| | | | | |
|---|---|---|---|---|
| 5,449,101 A * | 9/1995 | Van Dusen | B60R 9/06 | 224/523 |
| 6,361,264 B1 * | 3/2002 | Guthrie | B60R 9/065 | 224/521 |
| 6,698,995 B1 * | 3/2004 | Bik | B65F 1/1473 | 224/547 |
| 7,380,803 B2 * | 6/2008 | Thomas | B62B 5/0003 | 224/520 |
| 7,614,637 B1 * | 11/2009 | Kidd | B60D 1/00 | 280/480 |
| 8,162,192 B1 * | 4/2012 | Sanchez | B60R 9/06 | 224/521 |
| 8,714,901 B2 * | 5/2014 | Cordy | B65F 3/041 | 414/920 |
| 9,586,637 B2 * | 3/2017 | Kentner | B62D 63/064 | |

* cited by examiner

*Primary Examiner* — Jonathan Snelting
(74) *Attorney, Agent, or Firm* — Amster, Rothstein & Ebenstein LLP

(57) ABSTRACT

The present invention relates to a device for transporting a waste container. The device comprises a mount for mounting the device to a vehicle, a central support for supporting the waste container, the central support being connected to the mount and being extendable to lift the waste container off the ground, an attachment element for attaching the waste container to the central support, and a lifting mechanism for raising and lowering the waste container when the waste container is attached to the central support, wherein the device is configured such that when the device is mounted to the vehicle, a waste container can be lifted and transported by the vehicle in a substantially upright position.

13 Claims, 7 Drawing Sheets

DEVICE FOR TRANSPORTING A WASTE CONTAINER

CROSS-REFERENCE TO RELATED APPLICATIONS

This application is a U.S. national stage entry under 35 U.S.C. § 371 of PCT International Patent Application No. PCT/AU2020/050332, filed Apr. 3, 2020, which claims priority to Australian Patent Application No. 2019901146, filed Apr. 4, 2019, the contents of which are incorporated herein by reference in their entirety.

TECHNICAL FIELD

The present invention relates to a device for transporting a waste container, such as a wheelie bin.

BACKGROUND

Waste collection is part of the waste management process. Residential and commercial waste containers are typically collected from a location of use and then transferred for waste disposal and further processing, such as recycling. In Australia and other countries, in order to enable waste collection any waste containers need to be transported from the location of use, such as the residential building, to the closest road where the waste can be collected. However, a problem arises, if a distance between the location of use and the closest collection point is relatively far and the waste containers need to be transported over a long distance.

It would therefore be advantageous if at least an embodiment of the present invention overcame this problem or at least provided a workable solution to transport the waste container.

Any discussion of documents, acts, materials, devices, articles or the like which have been included in the present specification is not to be taken as an admission that any or all of these matters form part of the prior art base or were common general knowledge in the field relevant to the present invention as it existed before the priority date of each claim of this application.

Throughout the specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

SUMMARY

Embodiments of the present invention relate to a device for transporting a waste container, the device comprising:

a mount for mounting the device to a vehicle, a central support for supporting the waste container, the central support being connected to the mount and being extendable to lift the waste container off the ground, an attachment element for attaching the waste container to the central support, and a lifting mechanism for raising and lowering the waste container when the waste container is attached to the central support, wherein the device is configured such that when the device is mounted to the vehicle, a waste container can be lifted and transported by the vehicle in a substantially upright position.

Embodiments of the present invention provide significant advantages. In particular, the device may enable one or more waste containers to be transported by a vehicle.

In an embodiment, the mount may be configured to mount the device on a tow ball of the vehicle. However, a person skilled in the art will appreciated that other configurations are envisaged. For example, the mount may be configured to mount the device on a tow hitch or a tow bar of the vehicle.

In an embodiment, the device may comprise at least one lifting arm for supporting the waste container, wherein the at least one lifting arm is connected to a top portion of the central support. The at least one lifting arm may be configurable in a substantially horizontal direction relative to the ground. The at least one lifting arm may support one or more attachment elements for attaching to the waste container. If a plurality of attachment elements are provided, the plurality of attachment elements may be spaced, such as evenly spaced, along a length of the at least one lifting arm.

The at least one lifting arm may be movable between a lifting position and a folded position. Specifically, the at least one lifting arm may be foldable relative to the central support so that when the at least one lifting arm is moved from the lifting position into the folded position, the at least one lifting arm extends along a length of the central support. The at least one lifting arm may extend along a length of the central support in a substantially parallel manner. In this way, the device may be packed in a relatively compact configuration.

The device may comprise a locking element to lock the at least one lifting arm in position relative to the central support. The position may be the lifting position and/or the folded position. In one specific example, the device may comprise a lockable hinge connecting the at least one lifting arm to the central support. For example, the at least one lifting arm may comprise a tubular sleeve that is moveable relative to a length of the at least one lifting arm, wherein the device is configured such that when the at least one lifting arm extends, the tubular sleeve is moved to cover the hinge thereby locking the at least one lifting arm in the lifting position. However, other configurations are envisaged. For example, the hinge may be locked using a locking pin. Additionally or alternatively, the hinge may be configured to lock automatically when the at least of lifting arm is moved into the lifting position.

In one specific embodiment, the device comprises a pair of lifting arms arranged on each side of the central support. In this way, multiple waste containers may be transportable by the vehicle.

The attachment element may be in the form of a hook that is attachable to a handle of the waste container. However, other attachment elements are envisaged, in particular for situations where the waste container does not have a handle. In one embodiment, the attachment element may comprise a clamp, a fastener or any other suitable attachment element configured to attach the waste container to the central support.

In one specific example, the at least one lifting arm supports a plurality of attachment elements configured to attached to a handle bar of the waste container and the device is configured so that when the device is in use, the waste container is lifted in a substantially upright manner.

In an embodiment, the device may further comprise at least one support arm for supporting a lower portion of the waste container. In this way, the waste container may be lifted and transported in a substantially upright position. Specifically, the at least one support arm may be connected to a lower portion of the central support and configurable in a substantially horizontal direction relative to the ground. Thus, when the waste container is lifted off the ground, a lower portion of the waste container is supported and the waste container is kept in the substantially upright position. Furthermore, a lower portion of the waste container may be restricted from contacting the vehicle.

In a specific embodiment, the at least one support arm may be moveable between a supporting position and a folded position. Specifically, the device may be configured such that the at least one support arm extends along a length of the central support when the at least one support arm is in the folded position. The at least one support arm may be connected to the central support by a lockable hinge. The hinge may be constructed in a similar way as the hinge for the at least one lifting arm.

In one embodiment, the device comprises a pair of foldable lifting arms and a pair of foldable support arms, wherein the device is configured such that when the device is in use, the pair of foldable lifting arms extend substantially parallel relative to the pair of supporting arms.

The device may further comprise a platform for supporting a weight of the waste container. A person skilled in the art will appreciate that the platform may be shaped and sized to support one or more waste containers. Furthermore, the platform may be movable between a support position and a folded position, similar to the at least one lifting arm and/or the at least one support arm.

The lifting mechanism may comprise mechanical components, electronic components, hydraulic components or a combination of the aforementioned.

In one particular embodiment, the lifting mechanism comprises a hydraulic mechanism. The lifting mechanism may comprise a hydraulic cylinder that is fillable with a fluid to extend, thereby increasing a length of the central support of the device. The hydraulic mechanism may further comprise components, such as a pump, an actuator, a control valve and a reservoir to enable the hydraulic cylinder to extend and contract. In this way, by operating the hydraulic lifting mechanism, a waste container attached to the central support can be raised and lowered. A person skilled in the art will appreciate that hydraulic systems are well known in the art and will not be further described in the present application.

In an alternative embodiment, the lifting mechanism may comprise a threaded bar, wherein the device is configured such that by rotating the threaded bar, a length of the central support is increased or decreased. For example, the central support may comprise an inner section and an outer section forming a telescopic configuration, wherein the outer section is connected to a top portion of the threaded bar and the inner section comprises a fixed threaded nut for receiving the threaded bar. Thus, by rotating the threaded bar in a first direction, a portion of the threaded bar located above the fixed threaded nut increases in length whereas a portion of the threaded bar located below the fixed threaded nut decreases in length. In this way, the outer section can be moved upwards.

The device may comprise a drive unit for driving the lifting mechanism. The drive unit may be operated manually and/or electronically. For example, the drive unit may comprise a pump for pumping fluid in and out of the hydraulic cylinder. In a further example, the drive unit may comprise a worm drive for driving the threaded bar. The worm drive may be connected to a rotating handle and/or an electronic motor unit.

The drive unit may comprise an electronic motor unit connectable to a power source for electronically driving the lifting mechanism. For example, the drive unit may be connectable to a battery of the vehicle. Alternatively, the drive unit may comprise a rotating handle for mechanically driving the lifting mechanism, such as rotating the threaded bar. A person skilled in the art will appreciate that other configurations are envisaged, in particular depending on the type of lifting mechanism of the device.

It will be appreciated by persons skilled in the art that numerous variations and/or modifications may be made to the invention as shown in the specific embodiments and/or aspects without departing from the spirit or scope of the invention as broadly described. For example, it will be apparent that certain features of the invention can be combined to form further embodiments. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings.

BRIEF DESCRIPTION OF DRAWINGS

Certain exemplary embodiments of the present invention will now be described, by example only, with reference to the accompanying drawings in which.

DESCRIPTION OF EMBODIMENTS

Figure 1:
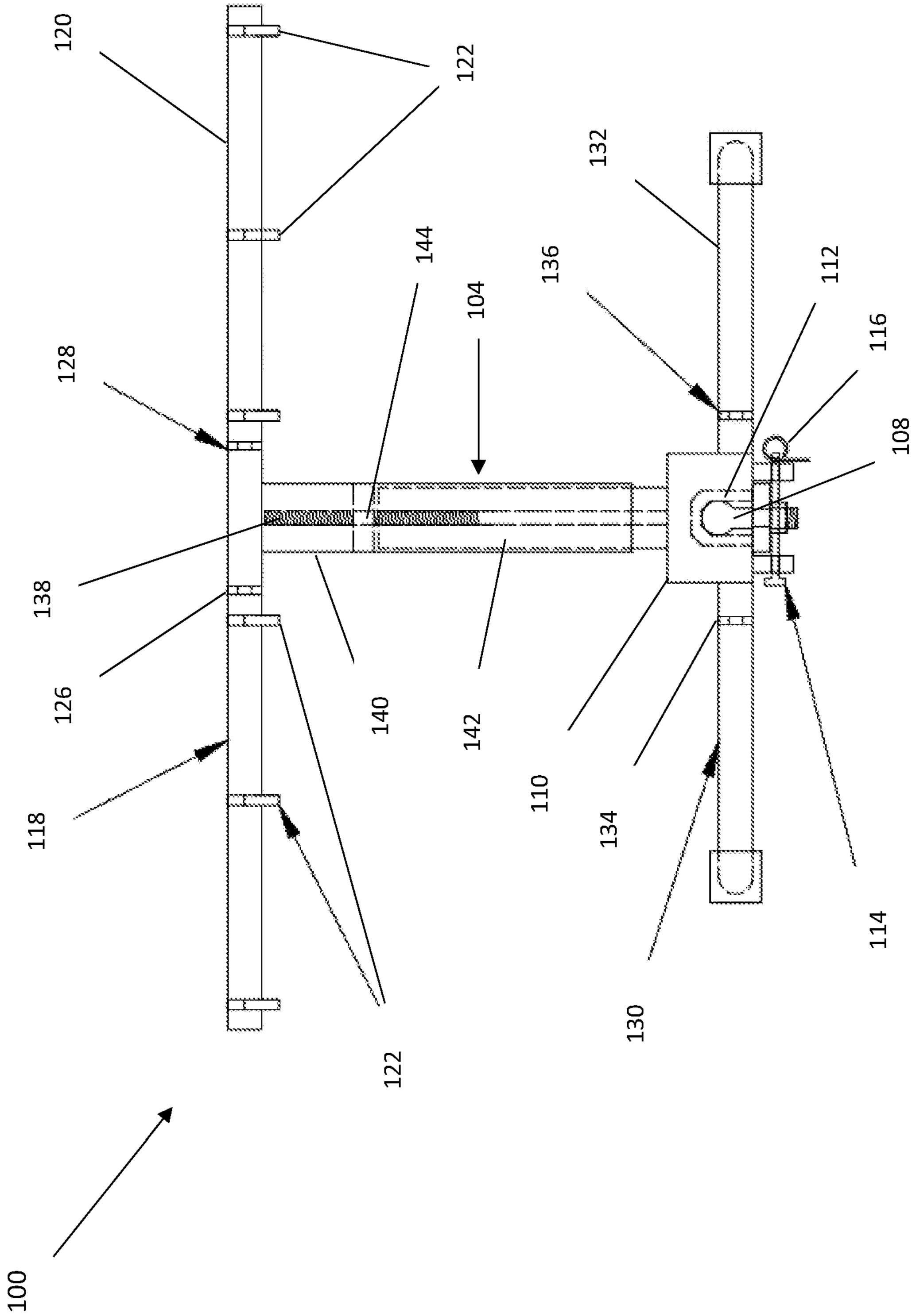
FIG. 1 is a schematic representation of a front view of a device for transporting a waste container in accordance with a first embodiment of the present invention.
Figure 2:
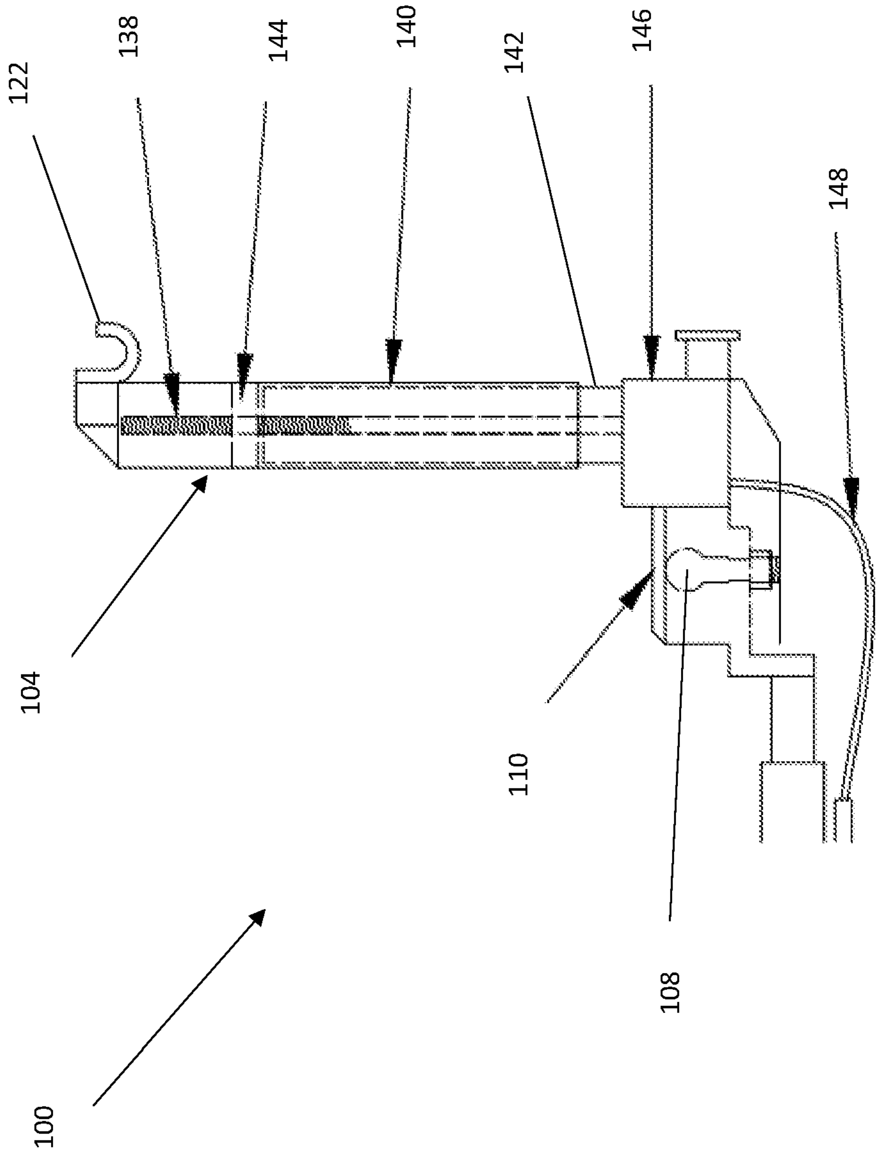
FIG. 2 is a schematic representation of a side view of the device of FIG. 1.
Figure 3:
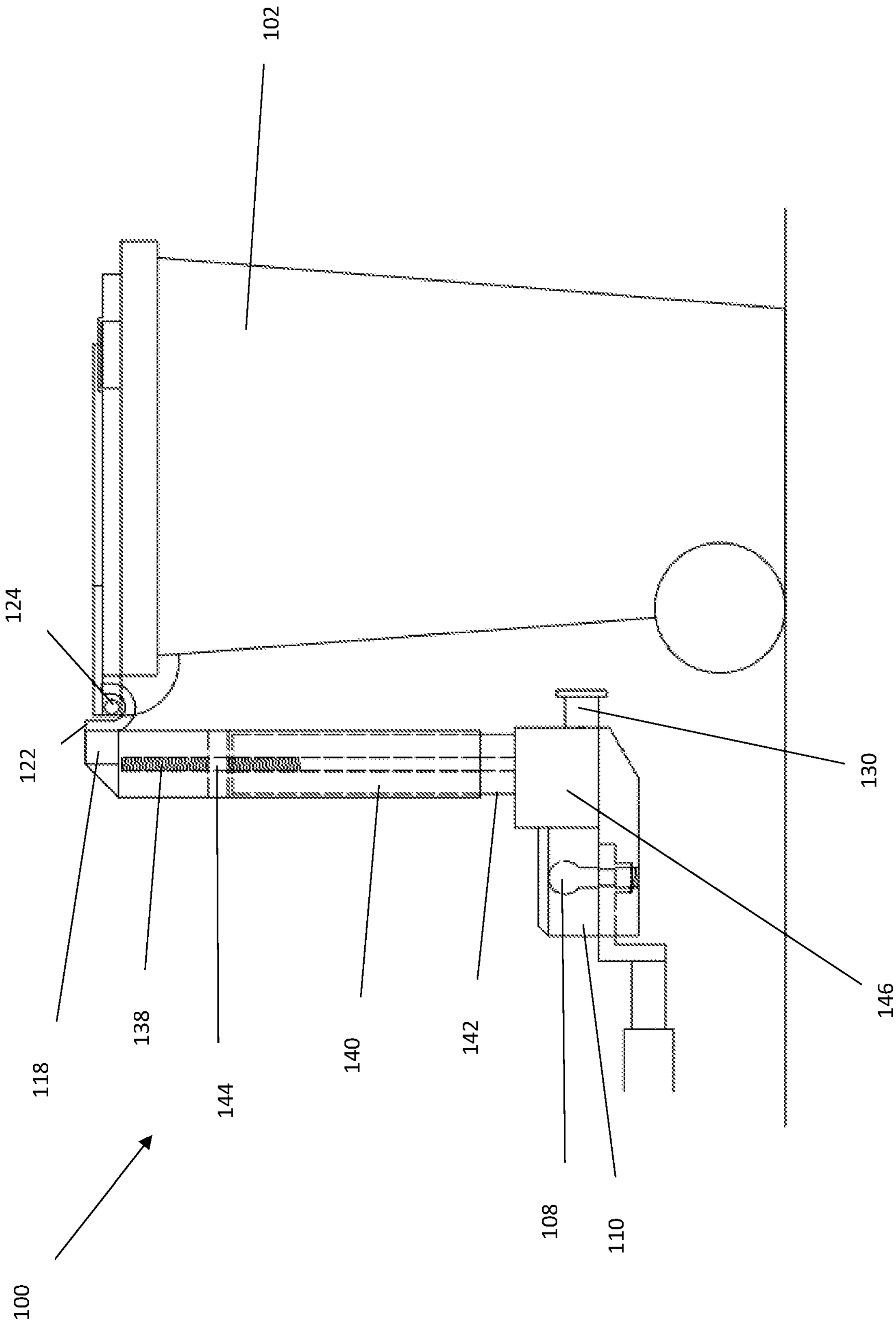
FIG. 3 is a schematic representation of a side view of the device of FIG. 1 when a waste container is attached to the device.
Figure 4:
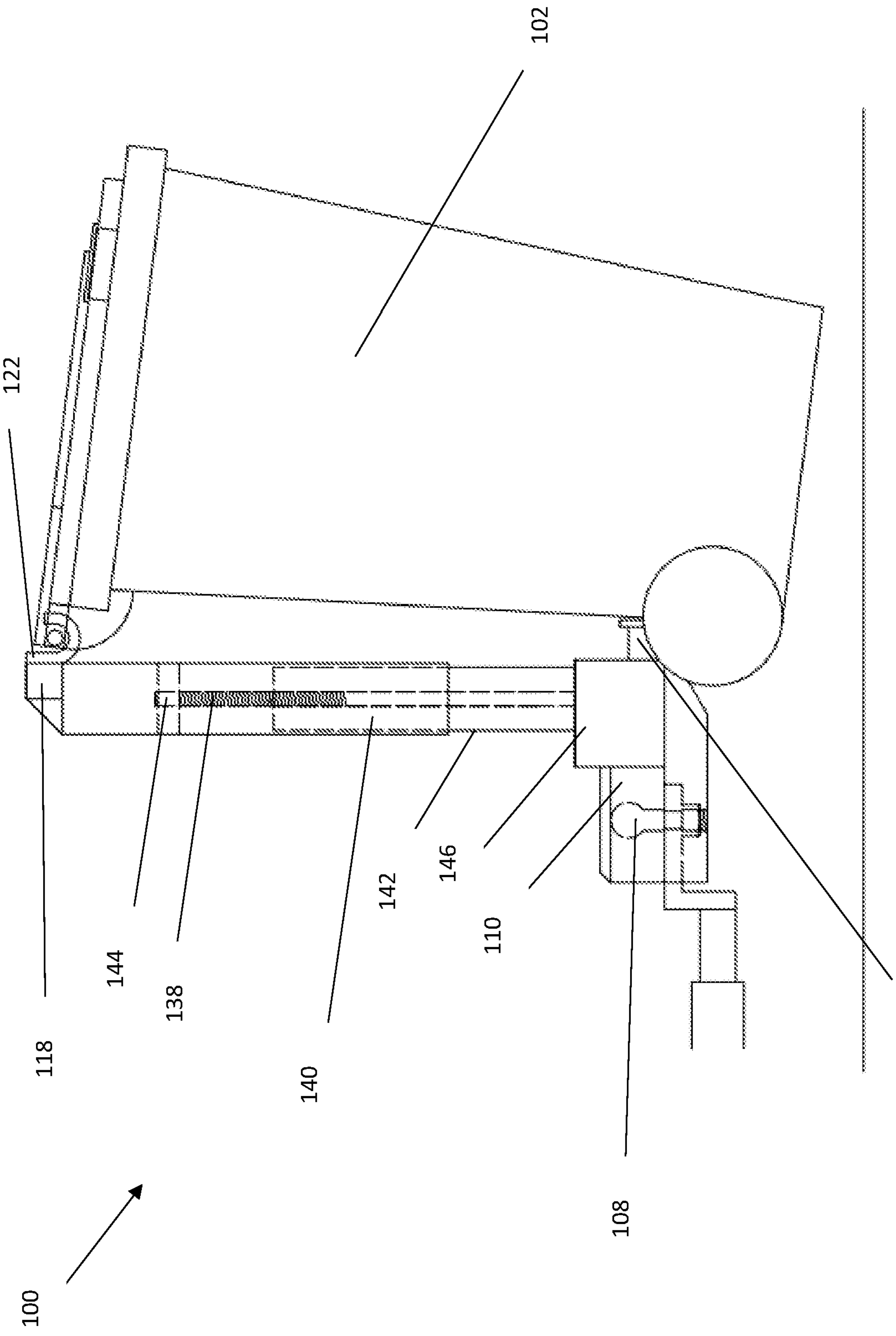
FIG. 4 is a schematic representation of the side view of the device of FIG. 3 when the attached waste container is lifted off the ground.
Figure 5:
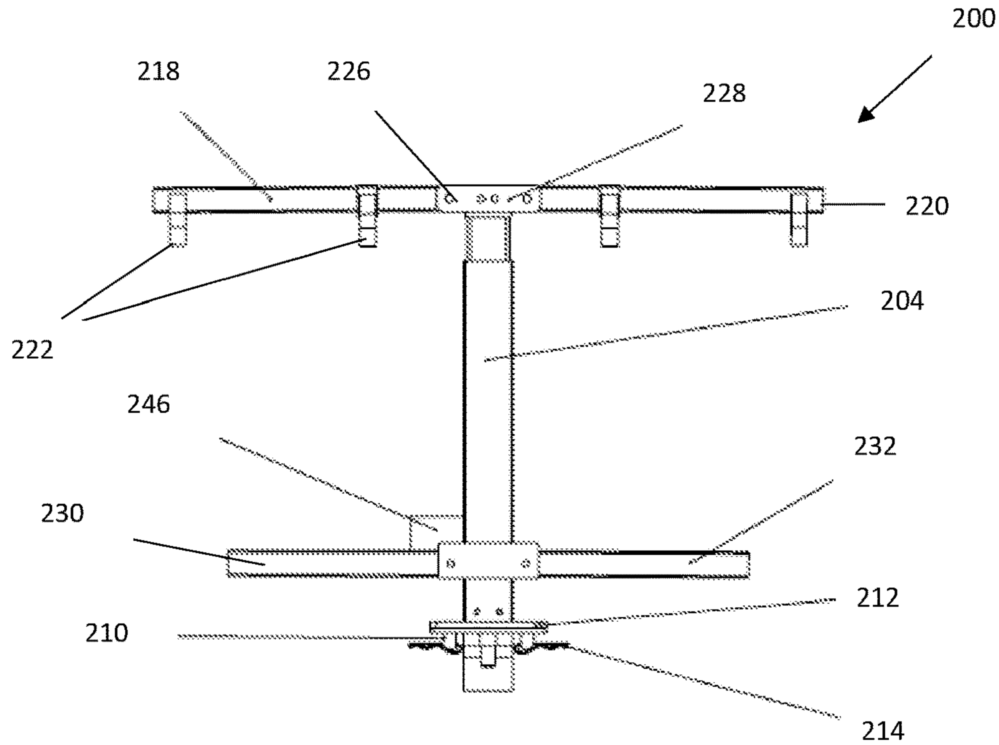
FIG. 5 is a front view of a device for transporting a waste container in accordance with a second embodiment of the present invention.
Figure 6:
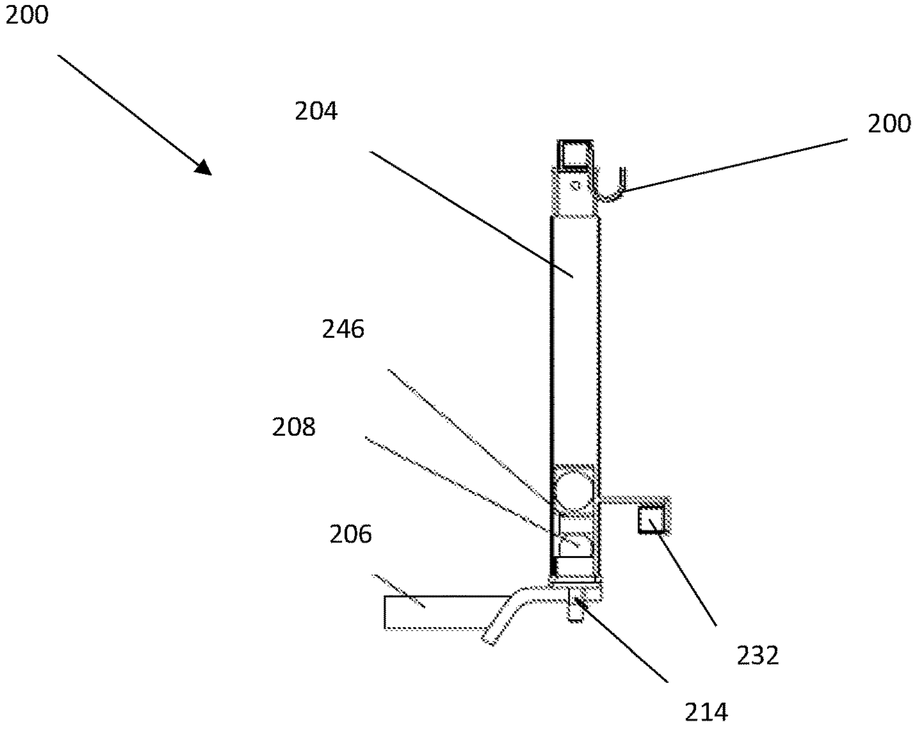
FIG. 6 is a schematic representation of a side view of the device of FIG. 5.
Figure 7:
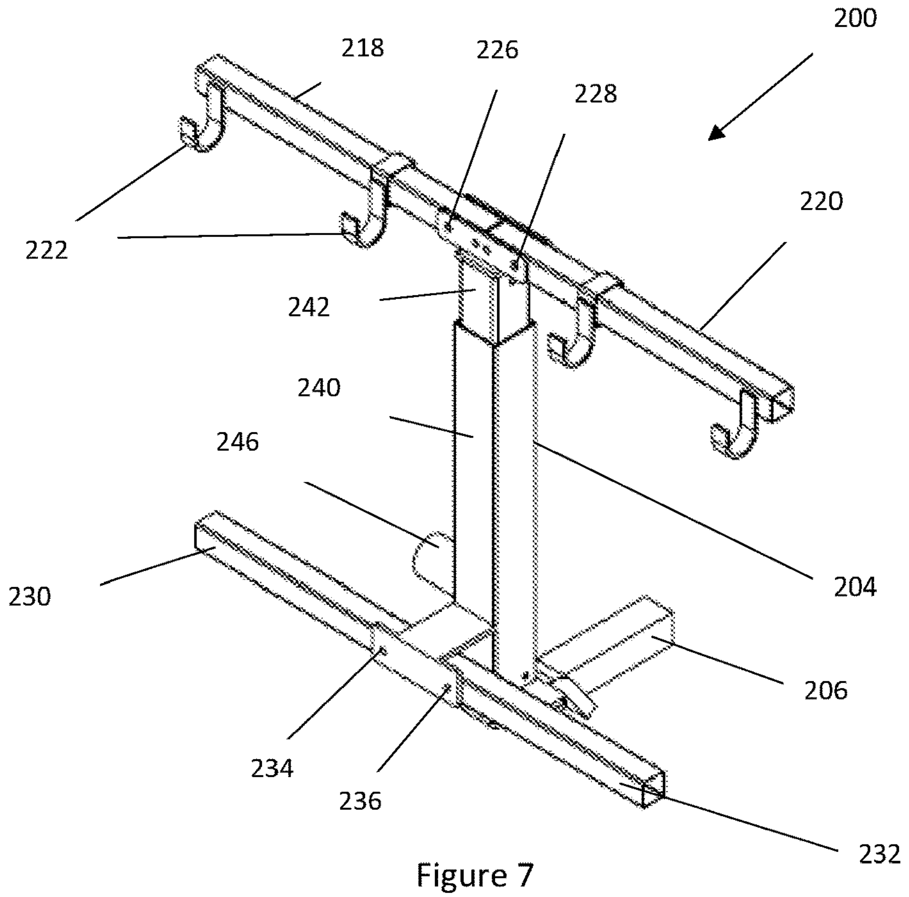
FIG. 7 is an isometric view of the device of FIG. 5 in an active/lifting configuration in which a waste container may be attached to the device.

Embodiments of the present invention generally relate to a device for transporting at least one waste container, such as a wheelie bin. The device comprises a mount for mounting the device to a vehicle, such as a tow ball of the vehicle, and a central support for supporting the waste container. The central support is connected to the mount and a length of the central support is extendable to lift the waste container off the ground. The device further comprises a lifting mechanism for increasing and decreasing a length of the central support, such as a hydraulic mechanism. The device also comprises an attachment element for attaching the waste container to the central support. The device is configured such that when the device is mounted to the vehicle, a waste container can be lifted and transported by the vehicle in a substantially upright position.

Embodiments of the present invention provide significant advantages. In particular, an embodiment of the invention enables transportation of one or more waste containers by a vehicle from the point of use to a collection point where the waste can be collected for waste disposal or further processing, such as recycling.

Referring now to FIGS. 1 to 4 of the accompanying drawings, there is shown different views of a device 100 for transporting a waste container 102, such as a wheelie bin, in accordance with a first embodiment of the present invention.

In this particular example, the device 100 comprises a central support 104 for supporting the waste container 102 and a mount 106 connected to the central support 104.

The mount 106 is configured to mount the device 100 on a tow ball 108 of a vehicle (not shown) in a way so that a length of the central support 104 extends in a substantially upright direction. In this regard, the mount 106 comprises a body 110 having a receptable 112 for receiving the tow ball 108. The mount 106 further comprises a pin 114 and a split pin 116 for securing the mount 106 to the tow ball 108. The mount 106 is configured such that a portion of the mount body 110 is supported by a leading edge of a platform (not shown) surrounding the tow ball 108. In this way, stability of the central support 104 may be improved.

A person skilled in the art will appreciate that other suitable mounts are envisaged. For example, the mount may be configured to attach to a tow hitch or a two bar of the vehicle.

The device 100 further comprises at least one lifting arm. In this example, the device 100 comprises a pair of lifting arms 118, 120 connected to a top portion of the central support 104. In use, each lifting arm 118, 120 extends in a direction substantially perpendicular relative to the central support 104. By providing more than one lifting arm, the device 100 may allow for the transportation of more than one waste container 102.

Each lifting arm 118, 120 supports at least one attachment element for attaching the waste container 102 to the central support 104. In this particular example, each lifting arm 118, 120 supports a plurality of attachment elements in the form of hooks 122. The plurality of hooks 122 may be spaced, such as evenly spaced, along a length of each lifting arm 118, 120. Further, each hook 122 may be moveable relative to the respective lifting arm. Providing hooks as attachment elements is particularly advantageous, if the waste container 102 has a handle bar 124 on which the hooks 122 can be attached. Even more so, by providing a plurality of hooks 122 that are spaced along a length of the lifting arm 118, 120, a weight of the waste container 102 can be distributed and the waste container 102 can be lifted in a substantially upright manner. However, depending on the configuration of the waste container, a person skilled in the art will appreciate that other attachment elements may be envisaged. For example, the attachment element may be in the form of a clamp, a fastener or a combination of the aforementioned to provide a greater degree of flexibility for different types of waste containers.

In this example, each lifting arm 118, 120 is connected to a top portion of the central support 104 by lockable hinges 126, 128. In this way, each lifting arm 118, 120 can be folded downwards to extend along a length of the central support 104. This has the particular advantage that the device 100 can be packed in a relatively compact manner and may be stored and transported in a suitable bag (not shown). A person skilled in the art will appreciate that any suitable hinge may be used for connecting the pair of lifting arms 118, 120 to the central support 104. For example, each lifting arm 118, 120 may comprise a tubular sleeve (not shown) that is movable relative to a length of the lifting arm 118, 120. Thus, when the lifting arms 118, 120 are folded out to extend as depicted in FIG. 1, the tubular sleeve may be moved to cover the hinges 126, 128. In this way, the tubular sleeve restricts the lifting arms 118, 120 from folding and are thereby locked in position. Alternatively, a hinge may be used that is locked by manually inserting a locking pin into a corresponding aperture of the hinge. Other examples may include hinges that have pins that are automatically released once the lifting arm is folded out and thereby locked.

When the lifting arms 118, 120 are extended, the lifting arms 118, 120 form one substantially straight line at a top portion of the central support 104 thereby forming a T-shape configuration.

The device 100 may further comprise at least one support arm for supporting a lower portion of the waste container 102 when the waste container 102 is lifted off the ground. In this example as shown in the drawings, the device 100 comprises a pair of support arms 130, 132 connected to a lower portion of the central support 104. Each support arm 130, 132 is connected to the central support 104 by a lockable hinge 134, 136 so that the support arm 130, 132 can be folded upwards to extend along a length of the central support 104. This has the particular advantage that a relatively compact design can be achieved for transporting the device 100. The lockable hinge 134, 136 may be of identical or similar configuration as lockable hinges 126, 128. When the pair of support arms 130, 132 is extended, the support arms 130, 132 form one substantially straight line that is substantially parallel to the pair of lifting arms 118, 120.

In this particular example, the support arms 130, 132 are connected to a portion of the central support 104 of the device 100 so that the support arms 130, 132 remain stationary when the waste container 102 is lifted. For example, the support arms 130, 132 may be connected to a lower portion of the central support 104 that remains stationary when the waste container 102 is lifted. In this regard, each support arm 130, 132 may comprise one or more rollers to guide movement of the waste container 102 when the waste container 102 is lifted by the lifting arms 118, 120.

In an alternative example (not shown), the support arms 130, 132 may be connected to a portion of the central support 104 or the at least one lifting arm 118, 120. In this example, the support arms 130, 132 raise and lower together with the lifting arms 118, 120, when the waste container 102 is lifted. In this regard, the support arms 130, 132 may comprise a layer of soft material or the like to cushion an impact of the waste container 102 with the support arms 130, 132 when the waste container 102 is lifted.

A further advantage of providing the pair of support arms 130, 132 may be that the waste container 102 is restricted from contacting the vehicle. In this way, the vehicle can be protected from any accidental impact by the waste container 102 when the waste container 102 is lifted and transported by the vehicle.

The device 100 further comprises a lifting mechanism for raising and lowering the waste container 102. In this particular example, the lifting mechanism has the function of increasing and decreasing a length of the central support 104 thereby raising and lowering the pair of lifting arms 118, 120.

In this example, the lifting mechanism is a mechanical mechanism and comprises a threaded bar 138 that extends along an inner portion of the central support 104. By rotating the threaded bar 138 in a first direction, a section 140 of the central support 104 can be lifted thereby extending a length of the central support 104. Accordingly, by rotating the threaded bar 138 in a second direction opposite to the first direction, the section 140 of the central support 104 can be lowered thereby decreasing a length of the central support 104.

The central support 104 comprises an inner section 142 that is connected to the mount 106 and an outer section, in this example, the section 140 that is moveable and can be raised/lowered. The inner and outer sections 140, 142 of the central support 104 form a telescopic arrangement where the inner section 142 can slide into the outer section 140 when the waste container 102 is lowered.

The inner section 142 comprises a fixed threaded nut 144 for receiving the threaded bar 138. Thus, when the threaded bar 138 is rotated in the first direction, a portion of the threaded bar 138 located above the fixed threaded nut 144 increases in length whereas a portion located below the fixed threaded nut 144 decreases in length. A top portion of the threaded bar 138 is connected to the outer section 140 of the central support 104. Thus, when the portion of the threaded bar 138 located above the fixed threaded nut 144 increases in length, the outer section 140 moves upwards thereby lifting the lifting arms 118, 120.

A person skilled in the art will appreciate that other lifting mechanism are envisaged. For example, the lifting mechanism may comprise different mechanical components, electronic components, or a combination of the aforementioned.

The device 100 further comprises a drive unit 146 for driving the lifting mechanism. In this particular example, the drive unit 146 comprises a worm drive and an electronic motor. The electronic motor is connectable to a power source, in this particular example to a battery (not shown) of the vehicle via a suitable cable 148. When the drive unit 146 is connected to the battery of the vehicle, the lifting mechanism can be operated electronically, for example, by virtue of a switch or remotely controlled.

In an alternatively embodiment (not shown), the drive unit may comprise a rotating handle connected to the worm drive. In this way, the lifting mechanism may be operated manually by rotating the handle.

A person skilled in the art will appreciate that other drive units are envisaged, in particular depending on the type of lifting mechanism used for the device 100.

Referring now to FIGS. 5 to 10, there is shown a device 200 for transporting one or more waste containers 202, 203 in accordance with a second embodiment of the present invention.

The device 200 is similar to the device 100 shown in FIGS. 1-4 in that the device 200 also comprises a central support 204 for supporting the one or more waste containers 202, 203, and a mount connected to the central support 204. The mount is configured to mount the device 200 to a tow hitch 206 of a vehicle, in particular to a tow ball 208 connected to the tow hitch 206.

In this example, the mount of the device 200 comprises a base plate 212 that is configured to engage with a tow ball mounting plate 210. Specifically, the device 200 is configured such that the base plate 212 can rest on the tow ball mounting plate 210. Furthermore, the base plate 212 comprises a pair of protrusions 213 that are arranged to extend through respective apertures in the tow ball mounting plate 210 when the base plate 212 is positioned on the tow ball mounting plate 210. Once the projections 213 protrude through the apertures, pins 214 can be attached to respective ends of the projections 213, thereby securing the device 200 to the tow hitch 206 of the vehicle. By mounting the device 200 to the two hitch 206 using plates 210, 212, the device 200 can be mounted to the vehicle in a substantially upright position.

Similar to the device 100, the device 200 also comprises a pair of lifting arms 218, 220 connected to a top portion of the central support 204 via lockable hinges 226, 228. The device 200 can therefore be configured in an active/lifting configuration and a folded configuration. In the active/lifting configuration, which is particularly shown in FIG. 7, the lifting arms 218, 220 extend in a substantially horizontal direction. In this configuration, a waste container 202, 203 may be attached to the lifting arms 218, 220 via the plurality of hooks 222. In the folded configuration, as particularly shown in FIG. 8, the lifting arms 218, 202 extend along a length of the central support 204. In this way, the device 202 can be packed in a relatively compact manner, for example for transportation or stowage purposes. A suitable bag may be provided.

Figure 9:
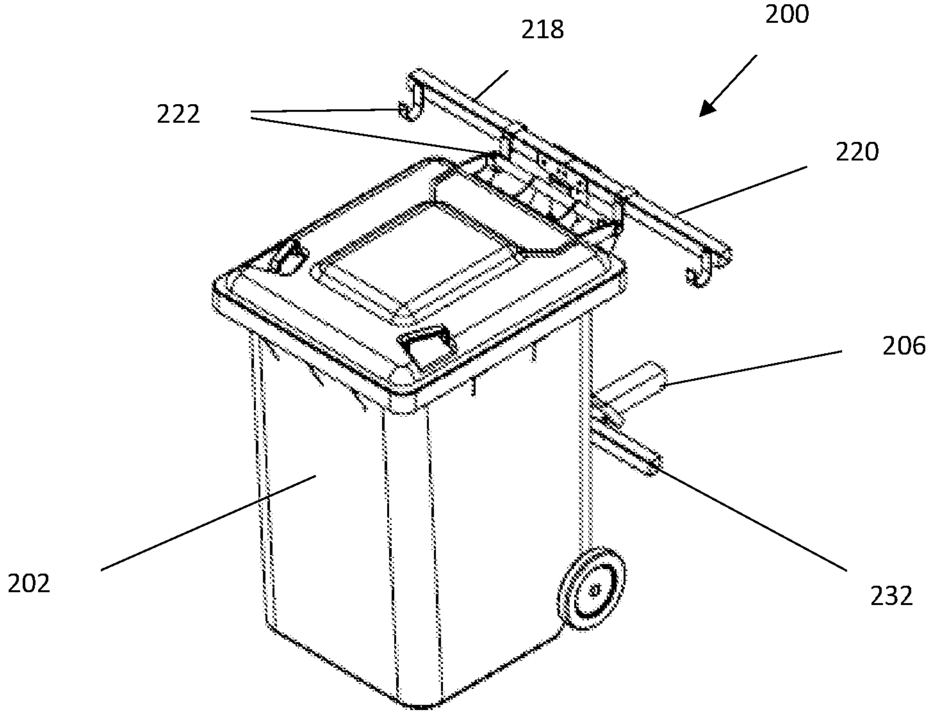
FIG. 9 is an isometric view of the device of FIG. 5 when one waste container is attached to the device.
Figure 10:
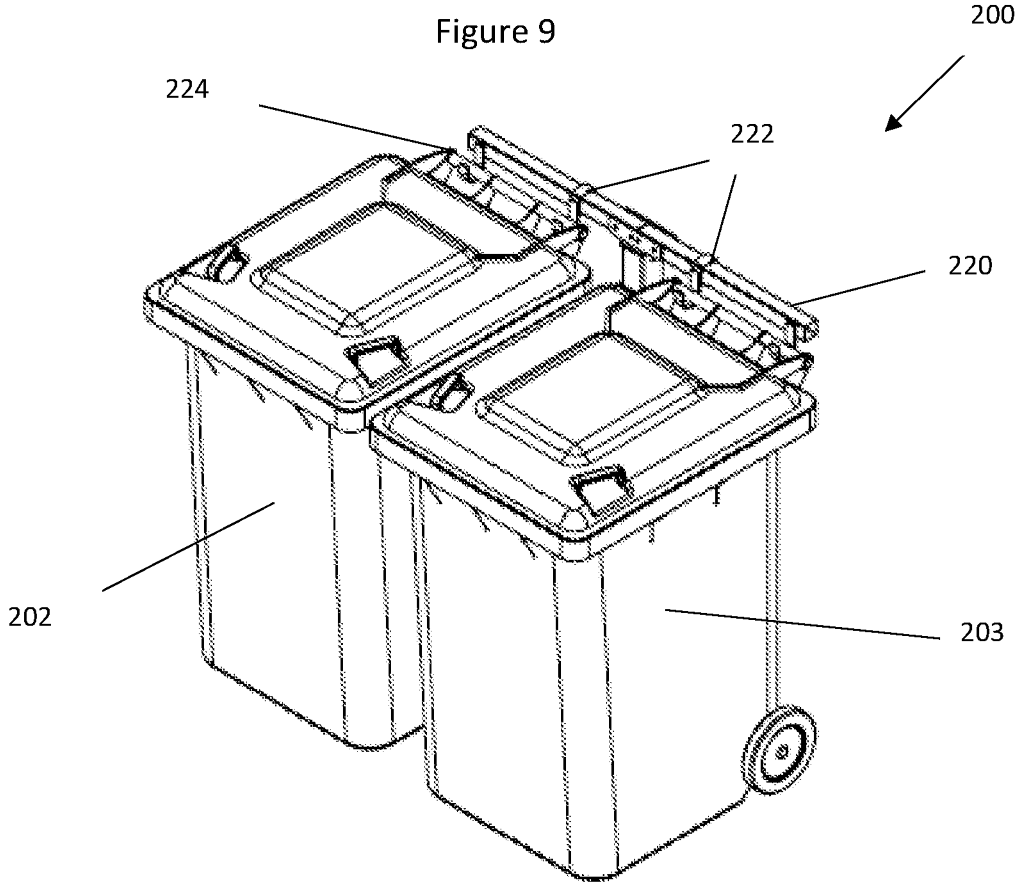
FIG. 10 is an isometric view of the device of FIG. 5 when two waste containers are attached to the device.

Each lifting arm 218, 220 supports a pair of hooks 222 for attaching to a handle bar 224 of a waste container 202, 203. In this way, the device 200 may transport one or more waste containers 202, 203. The device 200 supporting one waste container 202 is shown in FIG. 9. In this example, the handle bar 224 of the waste container 202 is attached to the central hooks 222 and thereby supported by both lifting arms 218, 220. The device 200 supporting two waste containers 202, 203 is shown in FIG. 10. In this example, each lifting arm 218, 220 supports one waste container 202, 203. A person skilled in the art will appreciate that a variation of the device 200 that can transport more than two waste containers is envisaged, for example, by providing more hooks, longer lifting arms or the like.

Figure 8:
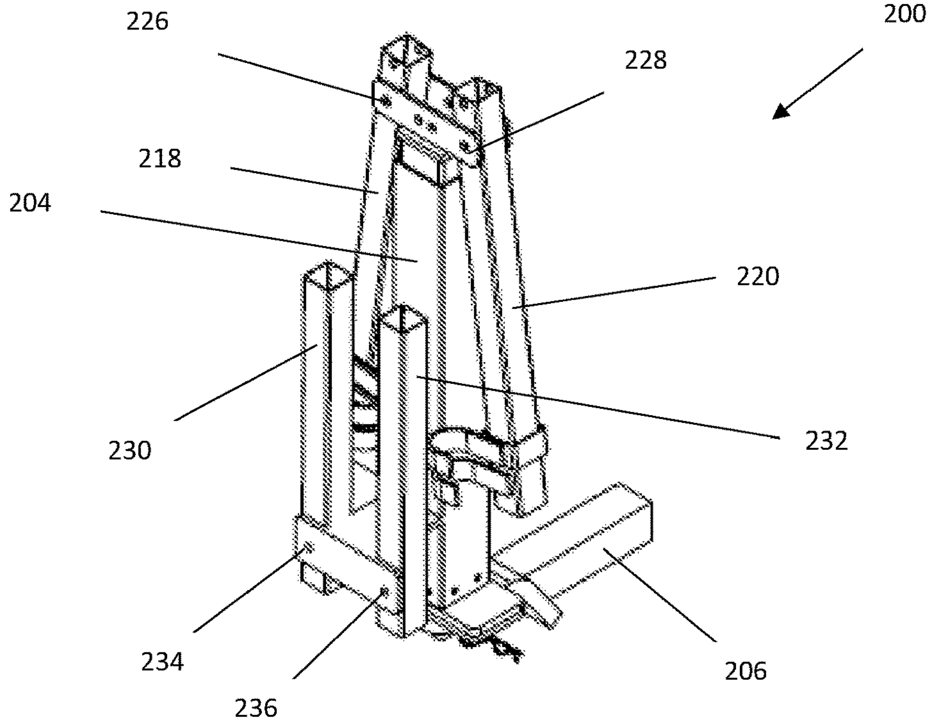
FIG. 8 is an isometric view of the device of FIG. 5 in a folded configuration for transportation or stowage of the device.

Similar to the device 100, the device 200 in accordance with this embodiment of the invention also comprises a pair of support arms 230, 232 for supporting a lower portion of the one or more waste containers 202, 203 when the one or more waste containers 202, 203 are attached to the device 200. Each support arm 230, 232 is connected to a lower portion of the central support 204 via a lockable hinge 234, 236. In this way, the support arms 230, 232 can be folded upwards to extend along a length of the central support 204 as shown in FIG. 8.

The device 200 further comprises a lifting mechanism for raising and lowering the one or more waste container 202, 203 by increasing and decreasing a length of the central support 204. In this example, the lifting mechanism is a hydraulic mechanism. Specifically, the lifting mechanism comprises a hydraulic cylinder (not shown) that is fillable with a fluid to extend a length of the hydraulic cylinder and thereby increases a length of the central support 204 of the device 200. For example, the central support 204 may be hollow and the hydraulic cylinder may be provided within the hollow space of the central support 204. Thus, when fluid is moved into the hydraulic cylinder, a length of the central support 204 increases thereby raising the pair of lifting arms 218, 220. Similar to the device 100, the central support 204 of the device 200 has a telescopic configuration, comprising an outer section 240 and an inner section 242 that are moveable relative to each other.

The hydraulic mechanism further comprises hydraulic components that are well known to a person skilled in the art, such as a pump, a control valve and a reservoir to enable the hydraulic cylinder to extend and contract. In addition, the device 200 may comprise an actuator 246 to actuate the lifting mechanism, for example by activating the pump and/or the control valve. In this way, by operating the hydraulic lifting mechanism, a waste container attached to the central support can be raised and lowered.

It will be appreciated by persons skilled in the art that numerous variations and/or modifications may be made to the invention as shown in the specific embodiments and/or aspects without departing from the spirit or scope of the invention as broadly described. For example, it will be apparent that certain features of the invention can be combined to form further embodiments. The present embodiments and aspects are, therefore, to be considered in all respects as illustrative and not restrictive. Several embodiments are described above with reference to the drawings.

These drawings illustrate certain details of specific embodiments that implement the systems and methods and programs of the present invention. However, describing the invention with drawings should not be construed as imposing on the invention any limitations associated with features shown in the drawings.

| Reference numerals |
|---|
| 100 device |
| 102 waste container |
| 104 central support |
| 106 mount |
| 108 tow ball |
| 110 mount body |
| 112 mount receptacle |
| 114 pin |
| 116 split pin |
| 118 first lifting arm |
| 120 second lifting arm |
| 122 attachment element (hook) |
| 124 handle bar |
| 126 first lockable hinge (lifting arm) |
| 128 second lockable hinge (lifting arm) |
| 130 first support bar |
| 132 second support bar |
| 134 first lockable hinge (support bar) |
| 136 second lockable hinge (support bar) |
| 138 threaded bar |
| 140 outer section (central support) |
| 142 inner section (central support) |
| 144 fixed threaded nut |
| 146 drive unit/worm drive/electronic motor |
| 148 cable |
| 200 device |
| 202 first waste container |
| 203 second waste container |
| 204 central support |
| 206 tow hitch |
| 208 tow ball |
| 210 tow ball mounting plate |
| 212 base plate |
| 214 pin |
| 218 first lifting arm |
| 220 second lifting arm |
| 222 attachment element (hook) |
| 224 handle bar |
| 226 first lockable hinge (lifting arm) |
| 228 second lockable hinge (lifting arm) |
| 230 first support bar |
| 232 second support bar |
| 234 first lockable hinge (support bar) |
| 236 second lockable hinge (support bar) |
| 240 outer section (central support) |
| 242 inner section (central support) |
| 246 actuator |

The invention claimed is:

1. A device for transporting a waste container, the device comprising:

a mount for mounting the device to a vehicle, a central support for supporting the waste container, the central support being connected to the mount and being extendable to lift the waste container off the ground, an attachment element for attaching the waste container to the central support, at least one lifting arm for supporting the waste container, the at least one lifting arm being connected to a top portion of the central support via a lockable hinge, and supports the attachment element; and a lifting mechanism for raising and lowering the waste container when the waste container is attached to the at least one lifting arm, wherein the at least one lifting arm is moveable between a lifting position in which the at least one lifting arm is arranged to support the waste container, and a folded position in which the at least one lifting arm extends along a length of the central support, and wherein the device is configured such that when the device is mounted to the vehicle and the at least one lifting arm is in the lifting position, a waste container can be lifted and transported by the vehicle in a substantially upright position.

2. The device of claim 1 wherein the mount comprises a mount body with a receptable for receiving a tow ball of the vehicle.

3. The device of claim 1, wherein the at least one lifting arm supports a plurality of attachment elements spaced along a length of the at least one lifting arm.

4. The device of claim 1, where the attachment element is in the form of a hook that is attachable to a handle of the waste container.

5. The device of claim 1, comprising at least one support arm for supporting a lower portion of the waste container.

6. The device of claim 5, wherein the at least one support arm is foldable to extend along a length of the central support.

7. The device of claim 1, wherein the central support comprises an inner section and an outer section forming a telescopic configuration.

8. The device of claim 7, wherein the outer section of the central support is connected to a top portion of the threaded bar and the inner section comprises a fixed threaded nut for receiving the threaded bar.

9. The device of claim 1, wherein the lifting mechanism comprises a threaded bar, wherein the device is configured such that by rotating the threaded bar, a length of the central support is increased or decreased.

10. The device of claim 1, comprising a drive unit for driving the lifting mechanism.

11. The device of claim 10, wherein the drive unit comprises an electronic motor unit connectable to a power source for electronically driving the lifting mechanism.

12. The device of claim 10, wherein the drive unit is connectable to a battery of the vehicle.

13. The device of claim 1, wherein the mount is configured such that when the device is mounted to a vehicle, a length of the central support extends in a substantially upright direction.

* * * * *